Patented Nov. 7, 1939

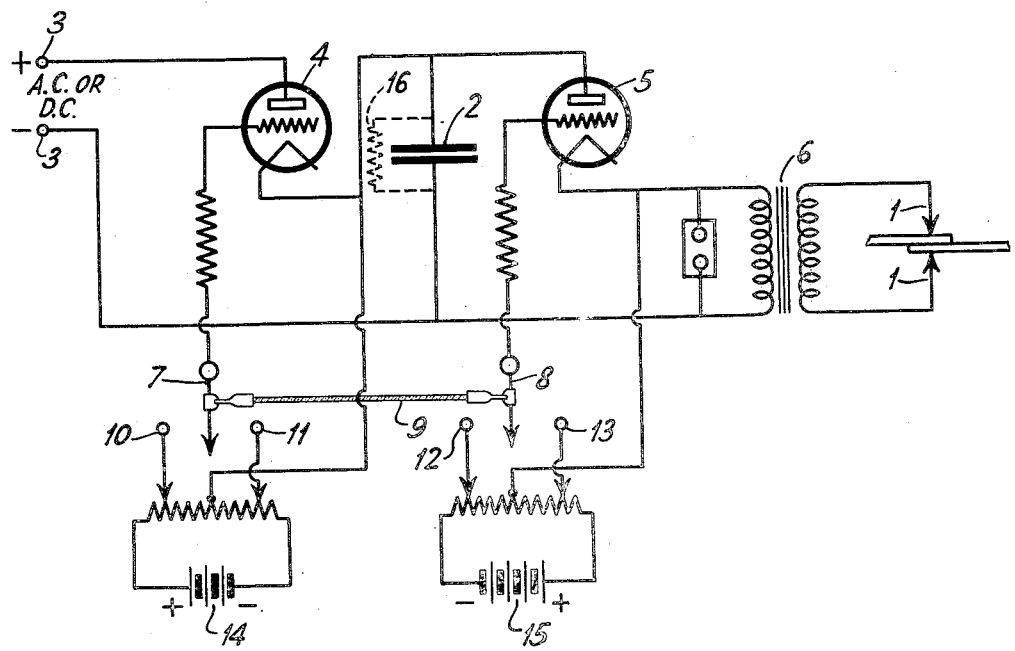
INVENTOR
WATSON SIDNEY
ATTORNEY

2,179,105

UNITED STATES PATENT OFFICE 2,179,105

CURRENT IMPULSE GENERATING CIRCUIT

Watson Sidney, Millburn, N. J., assignor, by mesne assignments, to Radio Corporation of America, New York, N. Y., a corporation of Delaware Application June 25, 1937, Serial No. 150,259

4 Claims. (Cl. 219—4)

My invention relates to circuits for generating current impulses or waves of high amplitude and short duration, and particularly to circuit means for supplying the waves to a low impedance load and for accurately controlling the quantity of electricity in the waves.

In electric welding, for example, where the amplitude and duration of the welding current must be accurately controlled, it has been proposed to pass through the junction of the pieces to be joined a high current from a large condenser. In such a circuit a switch with heavy poles must be provided for connecting the charged condenser to the low impedance load of the welding electrodes and the metal pieces to be joined, and a direct current source provided for charging the condenser between actual welding operations. The poles of the switch, which are subjected to heavy current arcing, soon corrode and fail, and when the welding switch is closed, the direct current power source for charging the condenser is short circuited through the welding electrodes, so that a power source of poor voltage regulation and a low charging rate for the condenser must be used. Corroded switch poles render it difficult to accurately control the amplitude and duration of the welding current and a power source of poor voltage regulation limits the speed of welding.

An object of my invention is to provide a current source for supplying current waves to a low impedance load with means for accurately controlling the quantity of electricity supplied to the load.

A specific object of my invention is to make an electric welder which does not overload the power source, which is capable of high speed operation and which accurately controls the amplitude and duration of the welding current.

According to one embodiment of my invention, a large condenser is connected in series through the anode-cathode space of a gas or arc discharge tube to a source of potential, either A. C. or D. C. The gas discharge device, preferably of the type controlled by a third electrode, such as a grid or an arc starting electrode, may not only serve as a switch for selectively connecting the condenser to the source, but serves, if an alternating current is employed, as a rectifier. A second grid controlled gas or arc discharge device, in series with a low impedance load, such as welding electrodes, or with the primary of a transformer coupled to the welding electrodes, is connected across the condenser. The control electrodes or grids of the two discharge devices are connected through two mechanical interlocked double throw switches to direct current biasing sources, the switches and biasing sources being so polarized as to selectively and alternately render the gas tubes conductive. In one position of the switches the condenser is connected to and charged by the source through the first tube and in the second position of the switches the first tube is rendered non-conducting to disconnect the condenser from the charging source and the second tube is rendered conductive to connect the condenser to the low impedance load circuit.

My invention is defined with particularity in the appended claims and one embodiment with the characteristic features of my invention is described in the following specification and the accompanying drawing.

The specific application of my novel circuit selected for purposes of illustration is welding. Two pieces of metal to be joined by welding are pressed together between welding electrodes 1, which, according to my invention, receive an impulse of current of predetermined magnitude and duration from condenser 2. Condenser 2 is charged from a source of current 3 which may be either alternating current or direct current. Grid controlled gas discharge devices 4 and 5 are coupled, respectively, between the source and the condenser, and between the condenser and the welding electrodes, the anode-cathode path of tube 4 being connected in series between one terminal of the source and the upper plate of the condenser, while the anode-cathode path of tube 5 is connected between said plate and the primary of the conventional welding transformer 6 of the welding electrodes. The grids of the two gas discharge devices are connected respectively to the movable contactors 7 and 8 of double throw switches, and are preferably mechanically interlocked by a device schematically shown as an insulating bar 9 to synchronously move the contactors into engagement with either switch contacts 10 and 12 or 11 and 13, which are connected to taps on direct current biasing sources 14 and 15.

Condenser 2, which may have a capacity of the order of 1000 microfarads, is charged by moving switch contactor 7 to the left to impress, from biasing source 14, a positive potential upon the grid of gas tube 4. The positive potential impressed upon the grid is selected sufficiently high that a gas discharge may be initiated between the anode and cathode of tube 4, the necessary anode-to-cathode potential being impressed upon the electrodes by the source through the normal leakage resistance 16 of the condenser. As the condenser becomes charged the potential between the anode and the cathode of gas tube 4 drops to a value below the ionizing potential of the gas, the arc extinguishes, and the charged condenser is then effectively isolated from the source.

The charged condenser 2 may then be suddenly discharged through the primary of transformer 6 by causing a gaseous discharge between the anode and cathode of tube 5. Switch contactors 7 and 8 are moved to the right to connect the grid of tube 5 to a positive source of potential through contact 13 and connect the grid of tube 4 to a negative potential, the positive potential on the grid of tube 5 being sufficiently high to initiate a gaseous discharge in that tube. The full charge of condenser 2 is immediately dissipated in the primary winding of the transformer 6 which causes sufficient welding current to flow in the secondary of the transformer to heat and weld the two pieces of metal together. Since the unidirectional current carrying anode-cathode space of tube 5 is in series with the circuit between the condenser 2 and its load, transitory oscillations of current in the load circuit are effectively prevented and the duration of current flow is limited to the first unidirectional surge of current after a gaseous discharge is started. The zone of heating about the contacting interfaces of the metal pieces to be welded may thus be confined, to localize recrystallization of the metal. The second and succeeding welds are made by simply reciprocating interlocking bar 9 first to the left to charge condenser 2 and then to the right to discharge the condenser through the weld or welding transformer, the limiting factor in the speed or frequency of welds being the time necessary to charge condenser 2 from source 3.

My improved circuit is particularly useful in welding where the welded pieces are automatically fed to a position between the welding electrodes, and the switch contactors 7 and 8 are reciprocated through interlocking bar 9 or convenient cams in synchronism with the feeding mechanism. It is to be understood that although the welding electrodes 1 are shown as coupled to the condenser discharge circuit through transformer 6, the welding electrodes could be directly connected in the discharge circuit. Further, the gas discharge devices shown, with thermionic cathodes and grids, may if desired be replaced by arc discharge devices with a mercury pool type cathode and an arc starting or control electrode.

For convenience my improved circuit has been described and illustrated in connection with a welder. The current impulses or waves of high amplitude and short duration supplied in the output of my improved circuit may be employed in many useful ways. In stroboscopic work for example, it is desirable to supply an illuminating device with periodic undulations of controlled amplitude, frequency and duration to generating a rapidly pulsating light of high intensity. By connecting the electrodes of a gas filled lamp in place of the primary winding of transformer 6, my improved circuit serves admirably to supply the desired periodic impulses of current to the lamp.

I claim:

1. An electrical welding apparatus with means for selectively supplying intermittent high amplitude welding current waves of short duration to welding electrodes, comprising welding electrodes, a relatively large condenser, a gaseous discharge device with an anode, cathode and discharge starting electrode, the discharge path of said device being coupled between the condenser and said welding electrodes, a biasing source connected to said cathode, a switch with a movable contactor connected to said starting electrode for selectively applying to said starting electrode a discharge initiating potential from said biasing source, a voltage source and means for discharging said condenser from said source.

2. Means for supplying intermittent high amplitude current waves to a low impedance load, comprising a relatively large condenser, a gaseous discharge device with an anode, cathode and discharge starting electrode, the discharge path of said device being coupled between the condenser and said load, a biasing source, a switch with a movable contactor connected to said starting electrode for selectively applying to said starting electrode a discharge initiating potential from said biasing source, a voltage source, means for selectively connecting said voltage source to the terminals of said condenser, and mechanical interlocking means for synchronously operating the connecting means and said movable contactor.

3. Means for supplying current waves of high amplitude to a low impedance load, comprising a high capacity condenser, a gas discharge device with an anode connected to one plate of said condenser, a cathode connected to one side of said load, and a control electrode, a connection between the other side of said load and the other plate of said condenser, a control electrode biasing source connected at one point to said cathode, a movable contactor for selectively connecting a positive or negative potential from said biasing source to said control electrode, a charging source, means for selectively connecting said charging source across said condenser, and a mechanical interlocking device for synchronously operating said means and said movable contactor.

4. An electric welding apparatus with means for supplying a high amplitude welding current wave of short duration to welding electrodes, comprising welding electrodes, a relatively large condenser, the electrodes and said condenser being coupled in a circuit through which energy stored in said condenser may be discharged through said electrodes, unidirectional current conducting means in said circuit for preventing the flow of oscillatory current in said circuit comprising a gaseous discharge device with an anode and a cathode connected in series in said circuit, means for starting a gaseous discharge in said device to discharge the energy in said condenser through said electrodes, and means for charging said condenser.

WATSON SIDNEY.